United States Patent
Ellison

[15] 3,670,274
[45] June 13, 1972

[54] EXPLOSION-PROOF VALVE OPERATOR

[72] Inventor: John E. Ellison, Newington, Conn.

[73] Assignee: Skinner Precision Industries, Inc., New Britain, Conn.

[22] Filed: Oct. 6, 1970

[21] Appl. No.: 78,513

[52] U.S. Cl. ............................335/260, 335/278, 129/141
[51] Int. Cl. ...........................................................H01f 7/08
[58] Field of Search..................335/251, 255, 260, 262, 278; 129/141

[56] References Cited

UNITED STATES PATENTS

| | | |
|---|---|---|
| 3,307,129 | 2/1967 | Mangiafico .......................335/260 X |
| 3,082,359 | 3/1963 | Mangiafico et al. ................335/260 X |
| 3,098,635 | 7/1963 | Delaporte et al. ..................335/260 X |
| 3,134,056 | 5/1964 | Eberle .....................................335/260 |

Primary Examiner—George Harris
Attorney—Prutzman, Hayes, Kalb & Chilton

[57] ABSTRACT

A valve operator wherein a solenoid housing has a cylindrical side wall and integral bottom wall having an opening for receiving an armature sleeve assembly. The bottom wall of the solenoid housing is supported on a nut secured to the sleeve assembly and having a radially extending flange substantially coextensive with the bottom housing wall for providing a metal-to-metal connection therebetween, and means including an end closure for the top of the housing compressively clamping the bottom housing wall against the flange of the nut to form a flameproof gas cooling escape path.

3 Claims, 1 Drawing Figure

PATENTED JUN 13 1972
3,670,274
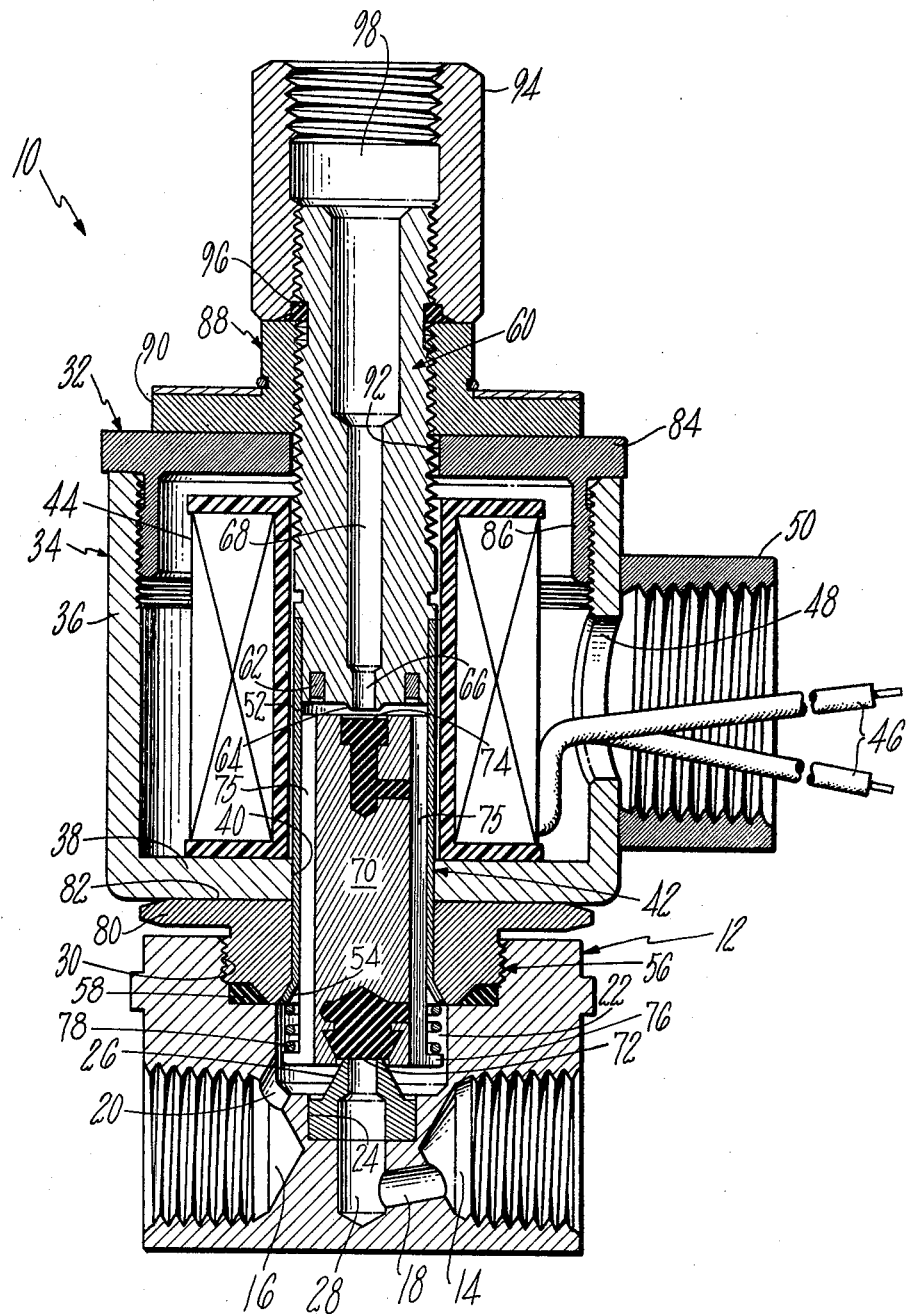
INVENTOR
JOHN E. ELLISON
BY Prutzman, Hayes, Kalb and Chilton
ATTORNEYS

EXPLOSION-PROOF VALVE OPERATOR

This invention generally relates to fluid control valves and particularly concerns explosion-proof valve operators for use in hazardous surroundings, e.g., in the presence of gasoline vapors, coal and coke dust, grain dust, and similar flammable atmospheres.

A primary aim of this invention is to provide an improved explosion-proof valve operator which eliminates any need for precision machining of mating parts of the solenoid housing of the operator and a valve body on which the operator is to be mounted.

Another aim is to provide an improved explosion-proof valve operator which eliminates any need for bolting together component parts of the assembly.

A further aim is to provide an improved explosion-proof valve operator particularly suited for use with a conventional valve body.

Another aim is to provide an improved explosion-proof valve operator utilizing a minimum number of different compact parts providing a durable construction capable of withstanding explosion pressures without rupture.

Still another aim is to provide an improved explosion-proof valve operator quick and easy to manufacture and assemble for reliable operation under hazardous conditions.

Other objects will be in part obvious and in part pointed out in more detail hereinafter.

A better understanding of the objects, advantages, features, properties and relationships of the invention will be obtained from the following detailed description and accompanying drawing which sets forth certain illustrative embodiments and is indicative of the way in which the principle of the invention is employed.

The drawing shows a longitudinal sectional view, partly broken away, of a solenoid operated valve assembly incorporating this invention.

Referring to the drawing in detail wherein the illustrated valve assembly 10 incorporates a preferred embodiment of this invention, a conventional valve body 12 is provided having ports 14 and 16 shown aligned on opposite sides of the valve body 12 and respectively communicating with drilled passages 18 and 20. Passage 20 directly connects with a valve chamber 22 formed above a lower compartment 24 of reduced diameter within which a valve seat 26 is fitted to communicate through a central passage 28 to the passage 18 leading to port 14. The valve chamber 22 and lower compartment 24 in the valve body 12 are concentrically aligned with an enlarged upper compartment forming a top opening 30 in the valve body 12.

To control fluid flow through the ports 14, 16 and valve chamber 22 by electromagnetic means without igniting a hazardous surrounding explosive atmosphere in the event of arcing caused by electrical switching or other arcing phenomena, a solenoid valve operator 32 is provided in accordance with this invention which eliminates any need whatsoever for bolting together mating portions of the operator 32 and the body 12. In addition, the solenoid valve operator 32 of this invention is particularly suited for use with the aforementioned conventional valve body 12 without requiring any closely toleranced machining and/or matched part assembly in order to produce flameproof gas cooling escape paths at joints between the valve body 12 and the operator 32.

More specifically, the valve operator 32 comprises a cup-shaped solenoid housing 34 of generally U-shaped cross section formed of a suitable ferromagnetic flux-carrying metal acceptable for explosion-proof applications. The housing 34 has a generally cylindrical side wall 36 and integral bottom wall 38 having a flat lower surface and a central opening 40 for receiving a plunger sleeve assembly 42 of slightly reduced diametrical size relative to the opening 40. A conventional solenoid coil 44 is supported on the bottom wall 38 of the solenoid housing 34 in surrounding relation to the sleeve assembly 42, and lead wires 46, 46 for the coil 44 extend through an opening 48 in the side wall 36 of the housing 34. The opening 48 is provided with a threaded coupling 50 suitably secured to the housing side wall 36 in a conventional manner such as by brazing for connection to a rigid electrical conduit, not shown.

The sleeve assembly 42 comprises a nonmagnetic stainless steel guide sleeve 52 having a radially outwardly flared lower end 54 which will be understood to be welded to surrounding adjacent portions of a fastener or nut 56 to completely seal off from atmosphere the lower projecting end portion of the sleeve assembly 42 communicating with the inside of the solenoid housing 34. The nut 56 in turn may be simply screwed into the top opening 30 of the valve body 12 with a suitable seal 58 interposed between the nut 56 and the valve body 12 to provide a fluidtight connection preventing undesired fluid passage around the sleeve assembly 42 from the valve chamber 22 past the threaded connection between the nut 56 and the valve body 12. An upper terminal portion of the guide sleeve 52 is suitably secured, preferably by welding, to an elongated magnetic stop member 60 of the sleeve assembly 42. Member 60 is shown with a conventional A.C. shading ring 62 formed in its lower end surface which also provides a projecting valve seat 64 surrounding a central sleeve orifice 66 leading to an axial passageway 68 extending longitudinally through the stop member 60. A plunger 70 formed of suitable magnetic material has resilient inserts providing valve members 72 and 74 at its opposite axial ends and is received for reciprocating movement within the sleeve 52 for alternative sealing engagement with the valve seats 26 and 64. The plunger 70 is shown having longitudinally extending slots 75, 75 for permitting the passage of fluid media past the plunger 70 in the guide sleeve 52, and a radial flange 76 projecting outwardly from a lower end of the plunger 70 serves as a seat for one end of a coil compression spring 78 shown having its opposite end seated against the outwardly flared lower end of the sleeve 52.

Accordingly, the plunger 70 is normally urged downwardly into sealing engagement with the body valve seat 26 in the valve chamber 22, whereby port 16 is connected with the axial passageway 68 through the sleeve orifice 66. To connect the ports 14 and 16, the plunger 70 may be selectively attracted upwardly against its stop member 60 upon energizing the solenoid coil 44, thereby also sealing off the sleeve orifice 66 and opening the orifice within the body valve seat 26. Upon deenergizing the coil 44, the plunger 70 is returned to its illustrated normal position under the force of the return spring 78.

In the specific illustrated embodiment of this invention, the nut 56 carried on the lower portion of the sleeve assembly 42, for mounting the valve operator 32 to the conventional valve body 12, includes a substantially enlarged, radially extending flange 80 providing an upper planar surface 82 for supporting the bottom wall 38 of the solenoid housing 34. The upper planar surface 82 of the nut flange 80 is particularly suited to provide a readily formed metal-to-metal joint with the bottom wall 38 of the housing 34. When assembled with the nut flange 80 and bottom housing wall 38 in intimate surface-to-surface contact, a sufficiently restricted clearance is effected to minimize any possibility of flame or gases of a high temperature from passing between the bottom housing wall 38 and the nut flange 80 under internal explosion pressures from within the housing enclosure to ignite a surrounding hazardous atmosphere.

While many variables are considered in determining whether an enclosure construction affords adequate protection to contain internal explosions without danger of igniting a surrounding hazardous atmosphere, including the size and shape of the housing enclosure, the maximum explosion pressure, and other factors such as the ignition temperature of the surrounding atmosphere, certain well known standards have been established for acceptable explosion-proof enclosures. Existing standards for solenoid valves are set forth, e.g., in Underwriters' Laboratories, Inc. "Standard for Safety, Electrically Operated Valves for Use in Hazardous Locations, Class I, Groups A, B, C and D, and Class II, Groups E, F and G", UL 1002, Sept. 11, 1970. Assuming that the volume of the solenoid housing enclosure is less than 300 cubic inches, a metalto-metal joint flame path is required to be at least three-eighths inch long and the clearance between joint surfaces is required to be such that, when secured in assembly, a 0.0015 inch feeler gauge will not enter the joint more than one-eighth inch at any point. This standard applies to the above described joint between the nut flange 80 and the bottom housing wall 38.

It will be also noted that no path exists to allow a flame to pass from within the solenoid housing 34 below the nut 56 due to its aforementioned welded connection at the lower flared end portion of the sleeve 52, nor is any flame permitted to travel along a path upwardly beyond the sleeve 52 due to the described welded connection between the upper portion of the sleeve 52 and the stop member 60.

To provide an explosion-proof upper housing end closure particularly suited for quick and easy boltless assembly of the valve operator components, while preserving the advantages of low cost manufacture in a compact rugged construction, an end cap 84 is provided having a depending skirt 86 externally threaded for engagement with internal threads formed in the upper open end portion of the housing side wall 36. To meet conventional explosion-proof standards of acceptance set forth in the above described Underwriters' Laboratories, Inc. standards, the entering part, i.e., the depending skirt 86, engages at least five full threads within the housing side wall 36 and is secured against removal by a fastener or nut 88 which is also threadably engaged with at least five full threads on an upper projecting end portion of the stop member 60. In addition, the nut 88 has a radially enlarged collar 90 whereby its bottom surface and the adjacent upper surface of the end cap 84 serve as mating planar faces which are quickly and easily machined for coplanar precision engagement in perpendicular relation to the longitudinal axis of the elongated sleeve assembly 42. By such construction the described threaded joint connections and the metal-to-metal joint between the cap 90 and end cap 84 may be readily formed to meet the aforementioned Underwriters' Laboratories, Inc. standards. Such joints accordingly effect flame paths to atmosphere from within the housing enclosure through paths of sufficient length and reduced clearance to cool burned gases passing therethrough under internal explosion pressures as well as to extinguish propagation of flames from within the solenoid housing enclosure to prevent ignition of any surrounding explosive atmosphere.

The described end closure has the additional virtue of providing a simplified end cap 84 formed with a central opening 92 of slightly larger dimension than that of the stop member 60, permitting the entire housing 34 to be selectively rotated into a desired angular position and longitudinally moved relative to the sleeve assembly 42 for facile assembly. This construction permits the housing 34 and its end cap 84 to be formed with significantly reduced tolerances and greater latitude for manufacturing variations than permitted in conventional designs featuring overlapping solenoid housing and valve body portions which frequently require relatively expensive precision machining to make suitable slip fittings for meeting stringent explosion-proof acceptance standards. Moreover, the upper retaining nut 88 need only be tightened onto the projecting stop member 60 to a predetermined torque load to compressively clamp the bottom housing wall 38 and end cap 84 to the mating planar engagement surfaces of their respective nuts 56 and 90. In the specific illustrated embodiment, the upper retaining nut 88 is shown secured against removal by a sleeve nut adaptor 94 threadably secured to an upwardly projecting terminal portion of the stop member 60 in fixed relation to the nut 88, with a suitable O-ring seal 96 being fitted therebetween. As illustrated, the sleeve nut adaptor 94 is provided with a port 98 at its upper end and adapted for connection to a suitable fluid coupling, not shown, although it will be understood that in certain other applications such an adaptor 94 may not be used.

An explosion-proof solenoid operated valve assembly constructed in accordance with this invention is not only particularly suited for quick and easy manufacture and assembly utilizing a minimum number of different parts of relatively reduced size compared to those conventionally required in explosion-proof assemblies, but the valve operator itself may be manufactured as a self-contained off-the-shelf unit which need only be screwed home into a mating opening of a conventional valve body which is normally produced in large production quantities. As a result, stocking of additional parts, commonly experienced with a variety of different explosion-proof models of valve assemblies, is also minimized to provide further economies made possible by the easily manufactured and explosion-proof solenoid valve operator of this invention.

As will be apparent to persons skilled in the art, various modifications, adaptations and variations of the foregoing specific disclosure can be made without departing from the teachings of the present invention.

I claim:

1. An explosion-proof solenoid operated fluid control valve operator mountable on a valve body and usable in an explosive surrounding atmosphere having a known ignition temperature, the valve operator comprising a solenoid coil, a one-piece cup-shaped solenoid housing formed of metal, the housing having a generally U-shaped cross section and including a generally cylindrical side wall surrounding the coil and a bottom wall integral with the side wall, a removable metal cap threadably secured to the top of the housing opposite its bottom wall, the bottom wall of the housing and its cap each having an opening generally concentric with the coil, an elongated sleeve assembly received within the coil and having opposite lower and upper end portions projecting through the openings in the bottom wall of the housing and its cap, the housing and its cap being movable as a unit longitudinally of the sleeve assembly, a nut formed of metal for mounting the valve operator to a valve body, the nut being fixed about the lower projecting end portion of the sleeve assembly in fluid-tight sealed engagement therewith, the nut having an upper planar surface extending radially of the sleeve assembly for abutting engagement substantially coextensive with the bottom wall of the housing, and a fastener having a threaded connection to the upper projecting end portion of the sleeve assembly for engaging the cap and clamping the bottom wall of the housing into compressed engagement with the upper planar surface of the nut to form an assembly joint of a predetermined minimum length and maximum clearance defining a flameproof gas cooling escape path communicating with the inside of the housing to effect cooling of any gases passing therethrough under internal explosion pressures to a point below the ignition temperature of the surrounding atmosphere.

2. The valve operator of claim 1 wherein the fastener is formed of metal and includes an enlarged collar extending radially outwardly from the upper projecting end portion of the sleeve assembly and providing a bottom surface in overlying surface-to-surface engagement with the cap providing a flameproof gas escape path therebetween for containing any explosion within the housing to prevent ignition of the surrounding atmosphere.

3. The valve operator of claim 1 wherein the nut is welded to the lower projecting end portion of the sleeve assembly and includes an exposed externally threaded portion for facile valve body mounting of the valve operator.

* * * * *